United States Patent
Brausch et al.

(10) Patent No.: US 6,360,528 B1
(45) Date of Patent: Mar. 26, 2002

(54) CHEVRON EXHAUST NOZZLE FOR A GAS TURBINE ENGINE

(75) Inventors: John F. Brausch, Clarksville; Bangalore A. Janardan, West Chester; John W. Barter, IV, West Chester; Gregory E. Hoff, West Chester, all of OH (US)

(73) Assignee: General Electric Company, Cincinnati, OH (US)

( * ) Notice: Subject to any disclaimer, the term of this patent is extended or adjusted under 35 U.S.C. 154(b) by 333 days.

(21) Appl. No.: 08/961,794

(22) Filed: Oct. 31, 1997

(51) Int. Cl.[7] .............................. F02K 1/40; F02K 1/48
(52) U.S. Cl. .................... 60/262; 60/264; 239/265.17; 239/265.19; 181/220
(58) Field of Search .................... 60/262, 263, 264, 60/271, 39.5; 239/265.17, 265.13, 265.19; 181/213, 220

(56) References Cited

U.S. PATENT DOCUMENTS

| | | | |
|---|---|---|---|
| 2,846,844 A | | 8/1958 | O'Rourke |
| 2,930,185 A | * | 3/1960 | Tyler ................... 239/265.13 |
| 3,053,340 A | | 9/1962 | Kutney |
| 3,153,319 A | * | 10/1964 | Young et al. .......... 239/265.19 |
| 3,215,172 A | * | 11/1965 | Ardoin ................ 239/265.13 |
| 3,347,466 A | * | 10/1967 | Nichols ................... 181/213 |
| 3,443,757 A | * | 5/1969 | Townend ............. 239/265.13 |
| 3,568,792 A | * | 3/1971 | Urquhart ............. 239/265.19 |
| 3,648,800 A | * | 3/1972 | Hoerst ................. 239/265.19 |
| 3,656,302 A | * | 4/1972 | Townend .................... 60/263 |
| 3,927,522 A | * | 12/1975 | Bryce et al. ................ 60/262 |
| 4,214,703 A | * | 7/1980 | Sorensen et al. ........... 60/264 |
| 4,279,382 A | | 7/1981 | Wilson, Jr. .................. 239/11 |
| 4,280,587 A | * | 7/1981 | Bhat ........................ 181/213 |
| 4,284,170 A | * | 8/1981 | Larson ..................... 181/213 |
| 4,302,934 A | | 12/1981 | Wynosky et al. ............ 60/262 |
| 4,311,291 A | * | 1/1982 | Gilbertson et al. .... 239/265.19 |
| 4,401,269 A | | 8/1983 | Eiler ........................ 239/265 |
| 4,422,524 A | | 12/1983 | Osborn ...................... 181/215 |
| 4,878,617 A | * | 11/1989 | Novotny ................ 239/265.35 |
| 5,761,899 A | * | 6/1998 | Klees .......................... 60/262 |

FOREIGN PATENT DOCUMENTS

| | | |
|---|---|---|
| GB | 2146702 A | 4/1985 |
| GB | 2289921 A | 12/1995 |

OTHER PUBLICATIONS

Kandebo, "GE Team to Test New JSF Nozzle," Aviation Week & Space Technology, Apr. 15, 1996, p. 24.
Samimy et al, "Mixing Enhancement in Supersonic Jets via Nozzle Trailing Edge Modification," AIAA 97–1877, Jun. 29, 1997, pp: 1–23.
Zaman et al, "Control of an Axisymmetric Jet using Vortex Generators," Phys. Fluids vol. 6, No. 2, Feb. 1984, pp 778–793.
"Velocity Measurements Downstream of a Lobed–Forced Mixer with Different Trailing–Edge Configurations," 4549 Journal of Propulsion and Power 11 (1995), Jan./Feb., No. 1, Washington, D.C. US, pp. 87–97.
"Delta Wings May Cut Jet–Engine Noise, Boost Efficiency," Machine Design, 62 (1990) Dec. 6, No. 25, p. 74.

* cited by examiner

Primary Examiner—Ted Kim
(74) Attorney, Agent, or Firm—Andrew C. Hess; Nathan D. Herkamp

(57) ABSTRACT

A gas turbine engine exhaust nozzle includes an exhaust duct for channeling a gas jet. A plurality of adjoining chevrons are disposed at an aft end of the duct to define an exhaust outlet. Each of the chevrons is triangular in configuration, with a base, apex, side trailing edges converging therebetween, and radially opposite first and second surfaces bounded thereby. The trailing edges of adjacent chevrons are spaced laterally apart to define respective diverging slots disposed in flow communication with the duct. The chevrons have a concave contour axially between the bases and apexes which promotes jet mixing through the slots.

20 Claims, 4 Drawing Sheets

CHEVRON EXHAUST NOZZLE FOR A GAS TURBINE ENGINE

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The present invention relates generally to gas turbine engines, and, more specifically, to reduction of exhaust noise and infrared (IR) signature.

A typical gas turbine engine includes a compressor for compressing air which is mixed with fuel and ignited in a combustor for generating hot combustion gases which flow through one or more stages of turbines which power the compressor in a core engine configuration. Typically cooperating with the core engine is a low pressure compressor, such as a fan, disposed upstream of the high pressure compressor of the core engine, which is operatively joined to a low pressure turbine disposed downstream from the high pressure turbine of the core engine. The combustion exhaust gases discharged from the core engine flow through the low pressure turbine which extracts energy therefrom for powering the low pressure compressor or fan for use in powering an aircraft in flight for example. Alternatively, the low pressure turbine may be used for producing output shaft power in a marine or land-based industrial (M&I) application.

In a typical turbofan aircraft gas turbine engine application for powering an aircraft in flight, a core exhaust nozzle is used for independently discharging the core exhaust gases inwardly from a concentric fan exhaust nozzle which discharges the fan air therefrom for producing thrust. The separate exhausts from the core nozzle and the fan nozzle are high velocity jets typically having maximum velocity during take-off operation of the aircraft with the engine operated under relatively high power. The high velocity jets interact with each other as well as with the ambient air and produce substantial noise along the take-off path of the aircraft. Furthermore, the core jet is hot and produces an infrared signature which may be detected from afar.

The prior art includes various solutions for reducing jet noise and infrared signature. The solutions typically rely on vigorously mixing the hot core jet with the fan jet, or ambient air, or both, for reducing the velocities thereof and reducing the temperature thereof. In this way both noise and infrared signature may be reduced, but typically at the expense of engine efficiency and performance.

For example, convoluted or lobed mixers, also known as daisy mixers, may be used at the end of the core engine inside a long duct outer nacelle for internally mixing the core exhaust with the fan exhaust. Although noise and IR signature may be reduced, this is done at the expense of increases in nozzle weight, installed friction, and boat-tail drag. And, although jet noise may be reduced at lower frequencies, this is typically accompanied by an increased noise level at mid and high frequency ranges.

The mixer lobes are effective since they project into both the core exhaust and the fan exhaust, but therefore have performance losses associated therewith. Other types of sound suppressors are known which also project into the jet streams with differing degrees of performance loss and noise reduction. Exemplary devices include paddles, corrugations, mini-mixers, tabs, and vortex generators.

Accordingly, it is desired to reduce jet noise and IR signature with minimum reduction in engine performance, reduced mechanical complexity, and minimum increase, or even reduced, nozzle weight.

SUMMARY OF THE INVENTION

A gas turbine engine exhaust nozzle includes an exhaust duct for channeling a gas jet. A plurality of adjoining chevrons are disposed at an aft end of the duct to define an exhaust outlet. Each of the chevrons is triangular in configuration, with a base, apex, side trailing edges converging therebetween, and radially opposite first and second surfaces bounded thereby. The trailing edges of adjacent chevrons are spaced laterally apart to define respective diverging slots disposed in flow communication with the duct. The chevrons have a concave contour axially between the bases and apexes which promotes jet mixing through the slots.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
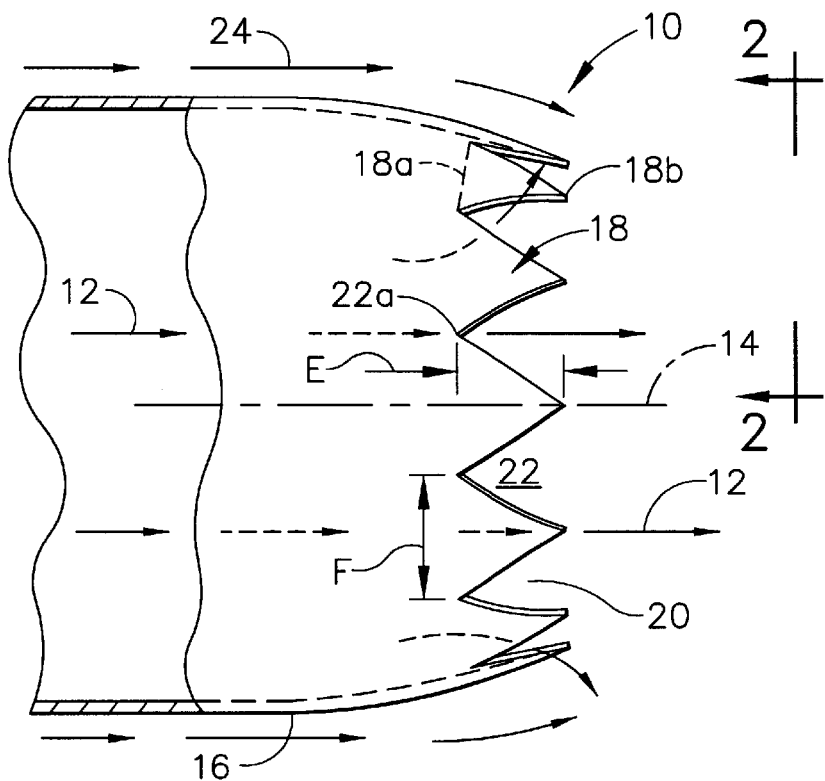
FIG. 1 is an axial side view, partly in section, of a portion of an exemplary gas turbine engine exhaust nozzle having an exhaust outlet defined by a plurality of adjoining chevrons in accordance with an exemplary embodiment of the present invention.
Figure 2:
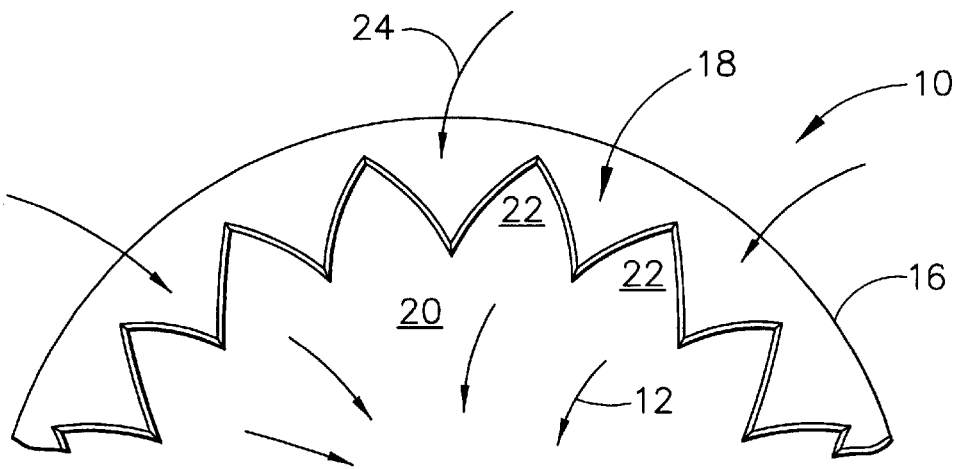
FIG. 2 is an aft facing forward view of a portion of the exhaust nozzle illustrated in FIG. 1 and taken generally along line 2—2.

Illustrated in FIG. 1 is an exemplary exhaust nozzle 10 for exhausting a gas jet 12 from a conventional gas turbine engine (not shown). The nozzle 10 is axisymmetric about an axial centerline axis 14, and includes an annular exhaust duct 16 for channeling the jet 12 therethrough along the centerline axis 14. The nozzle 10 also includes a plurality of circumferentially or laterally adjoining chevrons 18 integrally disposed at an aft end of the exhaust duct 16 to define an exhaust outlet 20, shown in more particularity in FIG. 2.

Figure 3:
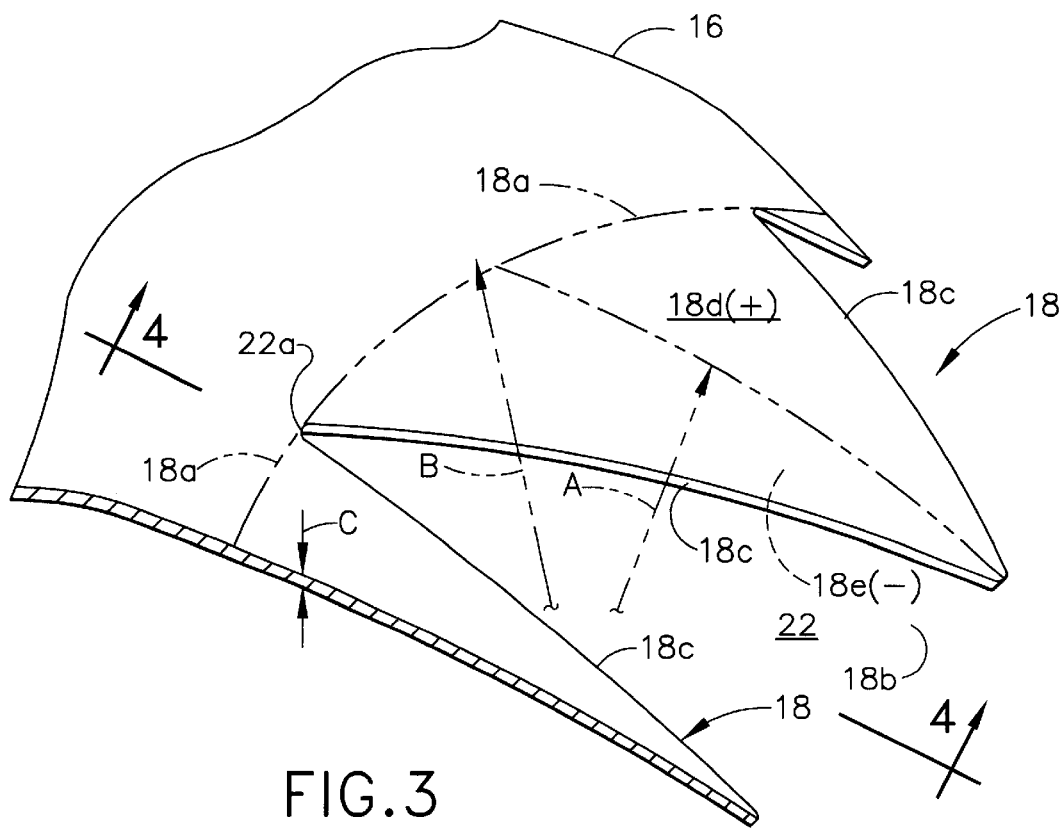
FIG. 3 is an isometric view of an exemplary one of the chevrons illustrated in FIGS. 1 and 2 enlarged to show more detail.

The chevrons 18 are illustrated in more particularity in FIG. 3, with each chevron 18 being triangular in configuration, with a base 18a fixedly or integrally joined to the duct aft end circumferentially or laterally coextensively with adjacent chevron bases 18a. Each chevron 18 also includes an axially opposite apex 18b, and a pair of circumferentially or laterally opposite trailing edges or sides 18c converging from the base 18a to the respective apex 18b in the downstream, aft direction. Each chevron 18 also includes a radially outer or first triangular surface 18d, and a radially opposite inner or second triangular surface 18e bounded by the trailing edges 18c and base 18a.

The trailing edges 18c of adjacent chevrons 18 are spaced circumferentially or laterally apart from the bases 18a to apexes 18b to define respective slots or cut-outs 22 diverging laterally and axially, and disposed in flow communication with the inside of the exhaust duct 16 for channeling flow radially therethrough. In the exemplary embodiment illustrated in FIG. 3, the slots 22 are also triangular and complementary with the triangular chevrons 18 and diverge axially aft from a slot base 22a, which is circumferentially coextensive with the chevrons bases 18a, to the chevron apexes 18b.

Figure 4:
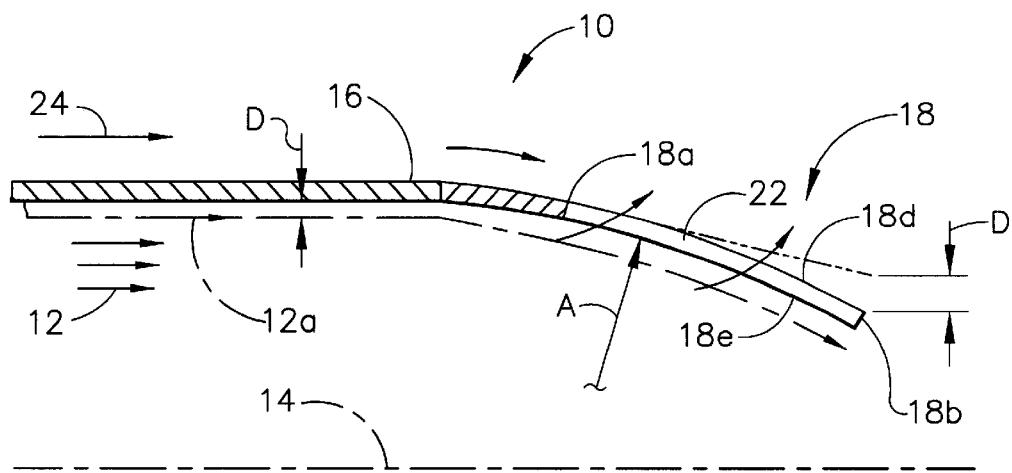
FIG. 4 is a side elevational view through one of the chevrons illustrated in FIG. 3 and taken generally along line 4—4.

In accordance with a significant feature of the present invention, each chevron 18 has a concave contour axially between the respective bases 18a and apexes 18b as illustrated in FIG. 3, and in more particularity in FIG. 4. The axial contour illustrated in FIG. 4 is defined by a first radius of curvature A disposed in the exemplary vertical plane including the centerline axis 14. The radius A of the axial contour may vary in magnitude from the chevron base 18a to the chevron apex 18b, and in the exemplary embodiment the axial contour is parabolic.

The individual chevrons 18 preferably also have a concave contour circumferentially or laterally between the trailing edges 18c as defined by a radius of curvature B as shown in FIG. 3. The radius B of the lateral contour may also vary along the circumferential arc between the opposite trailing edges 18c of each chevron 18, and preferably provides a smooth surface with the firstly defined axial contours. In this way, the chevron has a compound, three-dimensional flow surface contour defining a shallow concave depression or bowl for promoting mixing effectiveness. The compound curvatures may be defined by simple circular arcs, or by parabolic curves, or by higher order quadratic curves.

In the exemplary embodiment illustrated in FIGS. 3 and 4, the chevrons 18 have a substantially uniform thickness C which may also be equal to the thickness of the exhaust duct 16 from which they extend, and may be formed of one or more thin walled members or plates. Alternatively, the chevrons may vary in thickness to allow for structural rigidity and flow surface blending. And, in the exemplary embodiment illustrated, the chevron outer surface 18d is convex as represented by the plus sign (+), with the chevron inner surface 18e being concave as represented by the minus sign (−).

Although the individual chevrons 18 illustrated in FIG. 3, for example, could be flat components suitably inclined to define either a converging or diverging nozzle, the chevrons 18 have a slight, compound curvature for cooperating with the gas flow for promoting mixing effectiveness while at the same time providing an aerodynamically smooth and non-disruptive profile for minimizing losses in aerodynamic efficiency and performance.

For example, in the embodiment illustrated in FIG. 3, the chevron first surface 18d is disposed radially outwardly of the chevron second surface 18e with the outer surface 18d being convex, and the inner surface 18e being concave. The chevrons 18 and cooperating slots 22 are generally laterally or circumferentially coextensive with each other at generally common radii from the bases 18a to the apexes 18b for minimizing or reducing radial projection of the chevrons 18 into the exhaust jet 12. In the exemplary embodiment illustrated in FIGS. 1–4, the nozzle 10 is configured as a converging nozzle of decreasing flow area with an effective throat of minimum flow area being defined at a suitable location between the chevron bases 18a and apexes 18b. The individual chevrons 18 are therefore inclined radially inwardly from their forward bases 18a to their aft apexes 18b and thusly confine the exhaust jet 12 radially therebelow. However, the slots 22 allow the exhaust jet 12 to expand radially outwardly therethrough for promoting forced mixing.

As shown in FIG. 1, the exhaust jet 12 flows inside the exhaust duct 16 and is discharged both axially from its aft outlet 20 and radially outwardly through the chevron slots 22. The so discharged exhaust jet 12 may therefore mix with a radially outwardly surrounding outer gas stream 24 which, for example, may be ambient air flowing over the exhaust nozzle 10 either during aircraft ground static or flight, or may alternatively be fan air discharged from the gas turbine engine fan nozzle. Since the exhaust nozzle 10 may be used in various applications, the exhaust jet 12 and outer stream 24 may be any fluid streams typically found in a gas turbine engine, or in industrial applications involving gas handling and/or discharging apparatus.

Figure 5:
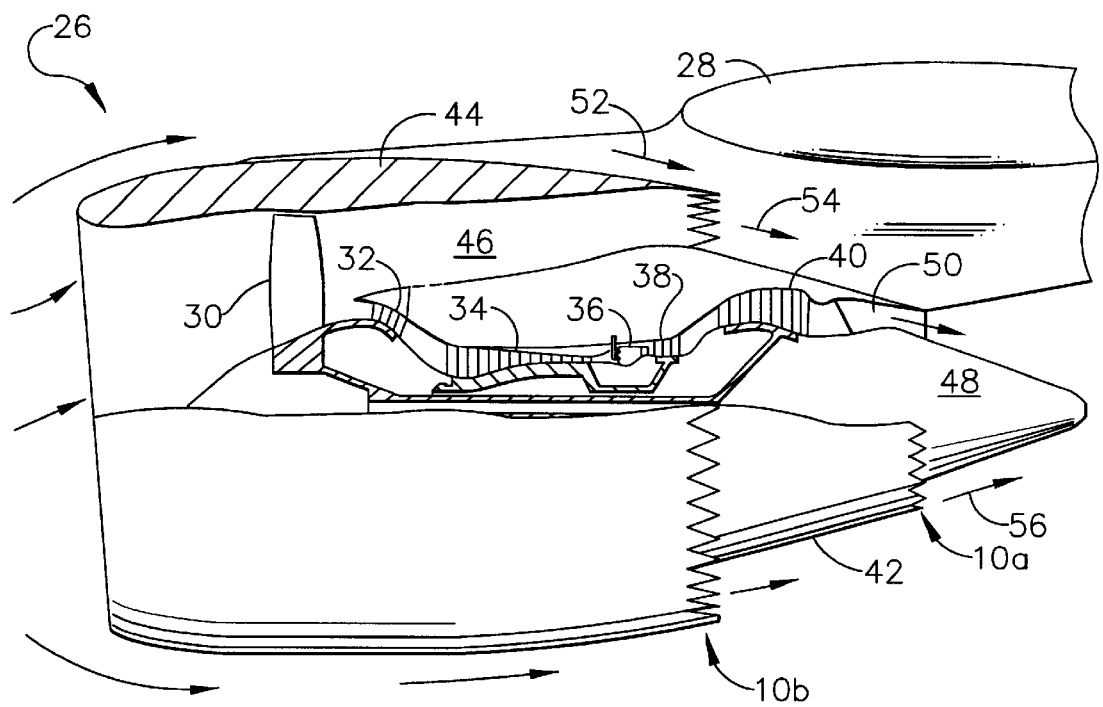
FIG. 5 is a side elevational view of an exemplary aircraft turbofan gas turbine engine including chevron exhaust nozzles in accordance with the present invention for both the fan and core exhausts.

For example, FIG. 5 illustrates an aircraft turbofan gas turbine engine 26 suitably joined to a wing of an aircraft 28 illustrated in part. The engine 26 includes in serial flow communication a fan 30, low pressure compressor 32, high pressure compressor 34, combustor 36, high pressure turbine (HPT) 38, and low pressure turbine (LPT) 40 operatively joined together in a conventional configuration. The engine 26 also includes a core nacelle or cowl 42 surrounding the core engine and LPT 40, and a fan nacelle or cowl 44 surrounding the fan 30 and the forward part of the core cowl 42 and spaced radially outwardly therefrom to define a bypass duct 46. A conventional centerbody or plug 48 extends aft from the LPT 40 and is spaced radially inwardly from the aft end of the core cowl 42 to define a core exhaust duct 50.

During operation, ambient air 52 flows into the fan 30 as well as around the fan cowl 44. The air is pressurized by the fan 30 and discharged through the fan duct 46 as a fan jet 54 for producing thrust. A portion of the air channeled past the fan 30 is compressed in the core engine and suitably mixed with fuel and ignited for generating hot combustion gases which are discharged through the core duct 50 as a core jet 56.

The improved exhaust nozzle 10 may be used at various locations in various types of gas turbine engines such as the turbofan aircraft engine illustrated in FIG. 5. For example, the exhaust nozzle is designated 10a for providing the chevrons 18 and slots 22 at the discharge end of the core cowl 42 for mixing the core jet 56 and the fan jet 54 for reducing jet noise and infrared signature. Another embodiment of the exhaust nozzle is designated 10b and is disposed at the discharge end of the fan cowl 44 for mixing the fan jet 54 with the ambient air 44 for reducing noise of the fan jet 54.

Both the core nozzle 10a and the fan nozzle 10b may be configured as disclosed in FIGS. 1–4 for providing preferentially configured chevrons 18 and slots 22 for mixing the various combinations of the gas jet 12, e.g. core jet 56 or fan jet 54, with the outer gas stream 24, e.g. fan jet 54 or ambient air 52, respectively. The various dimensions and contour shapes of the chevrons 18 and slot 22 may be suitably varied for each design application for maximizing noise reduction, or reducing infrared signature, or both, without a substantial increase in weight or aerodynamic efficiency losses.

For example, illustrated schematically in FIG. 4 is a boundary layer 12a of the exhaust jet 12 which flows along the radially inner surface of the exhaust duct 16 and chevrons 18. In a preferred embodiment, the chevron apexes 18b are displaced radially inwardly in depth D from an axial tangent to the chevron bases 18a with a magnitude on the order of the thickness of the boundary layer 12a. In this way, the axial contour of the chevrons 18 is relatively shallow as compared with a flat chevron for displacing the chevron apex 18b relative to the chevron base 18a sufficiently for disrupting the exhaust jet 12 at its boundary layer 12a and enhancing mixing. Alternatively, the depth D may be less than or substantially greater than the boundary layer thickness.

The chevrons 18 cooperate with the slot 22 to disrupt the gas jet 12 forcing a portion thereof to be ejected radially outwardly through the slot 22 into the outer gas stream 24 in the event of a positive differential pressure in the radial outward direction. With an opposite positive differential pressure in the radially inward direction, the outer gas stream 24 is forced radially inwardly through the slot 22 for promoting enhanced mixing. The chevrons also introduce paired sets of vortices which grow in scale as they travel axially and enhance the mixing process between the jet 12 and outer gas stream 24.

The various dimensions of the chevrons 18 and their compound curvature may be optimized for each design application depending on the location of the exhaust nozzle and types of gas jet 12 and outer gas stream 24, as well as on the differential pressure between those two gas streams. In embodiments wherein the exhaust nozzle 10 illustrated in FIGS. 1–4 is configured as a converging nozzle, the chevrons 18 are preferably concave inwardly as shown which cooperates with the gas jet 12 expanding radially outwardly in the chevron slots 22.

Figure 6:
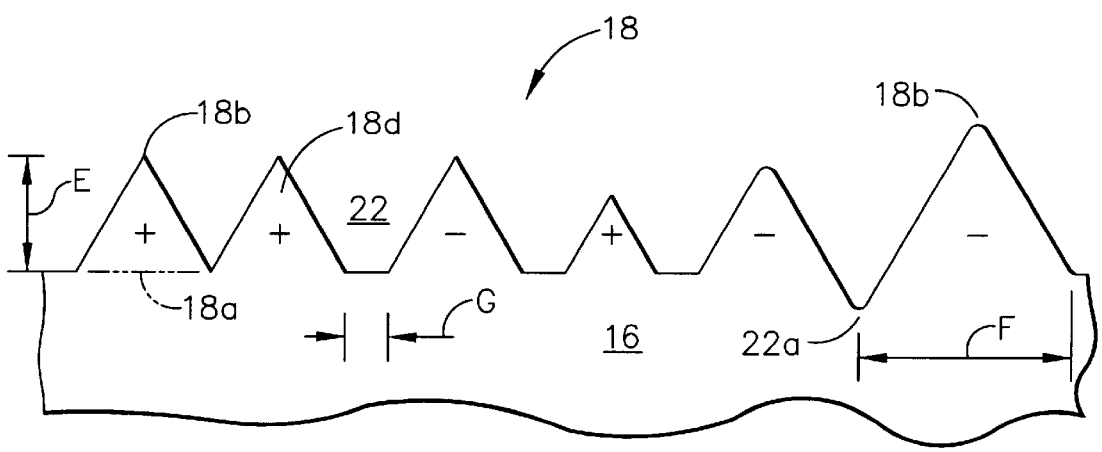
FIG. 6 is a top plan view of a chevron exhaust nozzle in accordance with additional embodiments of the present invention including variously configured alternate chevrons.

FIG. 6 illustrates schematically exemplary design parameters for various configurations of the chevrons 18 and cooperating slots 22 at the end of the exhaust duct 16. These various chevrons and slots are merely illustrated together on a common exhaust duct 16 for clarity of presentation and would not be used together as shown, but in various combinations thereof. An exhaust duct may either be axisymmetrical, elliptical, rectangular, or combinations thereof in cross section in accordance with conventional or advanced-design configurations. A number of individual chevrons 18 and sizes thereof may be selected for each design application for maximizing effectiveness.

Each chevron 18 has an axial length E measured perpendicularly from its base 18a to its apex 18b, and a lateral width F varying from a maximum value at the base 18a to a minimum value at the apex 18b. The chevron width F may be represented by the chord length for an axisymmetrical or elliptical nozzle, or may be measured by the circumferential length of the chevron. For a rectangular nozzle, the chevron width F may be simply measured by the lateral width of the chevron. The individual chevrons 18 may be spaced laterally or circumferentially apart at their bases 18a by a suitable spacing G as desired. In the embodiment illustrated in FIGS. 1–4, the adjacent chevrons 18 adjoin each other at the slot bases 22a with substantially no or little circumferential spacing G therebetween.

As illustrated in FIG. 1, the chevrons 18 preferably have equal axial lengths E from the bases 18a to the apexes 18b. However, as shown in FIG. 6, the chevron lengths E may be unequal and vary as desired.

Also in the exemplary embodiment illustrated in FIG. 1, the chevron apexes 18b are coplanar in a single axial plane, and at a common radius from the centerline axis 14. Similarly, the chevron bases 18a, and slot bases 22a, are also coplanar at another common axial plane spaced forwardly from the chevron apexes 18b, also at another common radius. However, as illustrated in FIG. 6, the chevron apexes 18b may be in different axial planes from chevron to chevron, and similarly, the slot bases 22a may also be in different axial planes from slot to slot if desired.

As also shown schematically in FIG. 6, the respective contours of the chevron outer and inner surfaces 18d, e may also vary from convex (+) to concave (−), respectively, or vice versa, or in any combination. And, as shown in FIG. 4, the deflection of the chevron apexes 18b may be radially inwardly toward the axial centerline axis 14, or may be opposite in the radially outward direction away from the centerline axis 14, or the deflection may be zero if desired.

However, the three dimensional geometric contour of the individual chevrons 18 may be used to advantage depending upon the specific design application for enhancing mixing while minimizing or eliminating aerodynamic performance losses during operation. Significant jet noise reduction may be obtained, as well as significant infrared signature reduction when a relatively cold airstream is mixed with the relatively hot core jet 56. The individual chevrons 18 blend well with the aft end of the exhaust duct 16 preferably initially tangent thereto, with a nonlinear contour both in the axial downstream direction and in the circumferential or lateral direction. This three dimensional contoured profile eliminates chevron surface discontinuities in both the outer and inner flowpaths for providing improved aerodynamic efficiency.

The relatively small projection of the chevron apexes 18b into the jet produces aerodynamically smooth flow guidance to force an accelerated mixing process of jet-to-jet or jet-to-ambient air, and generates significant streamwise vorticity which further accelerate the mixing process. The resultant shorter mixed-jet plume length and reduced plume perimeter results in lower levels of audible jet noise and significantly reduced infrared signature over the prior art.

Figure 7:
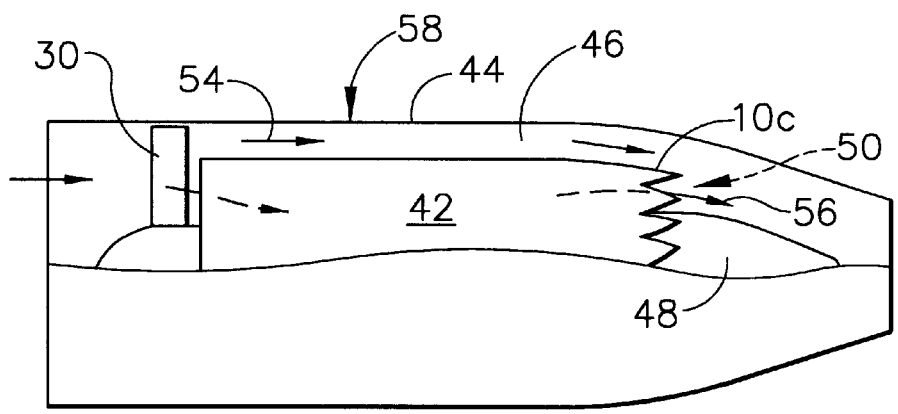
FIG. 7 is a side elevational view of a long duct mixed flow gas turbine engine including a chevron mixer in accordance with an alternate embodiment of the present invention.

As indicated above, the improved chevron exhaust nozzle may be used in various configurations in gas turbine engines such as the turbofan engine illustrated in FIG. 5. FIG. 7 illustrates an alternate embodiment of the chevron exhaust nozzle designated 10c disposed in an otherwise conventional long duct turbofan engine 58. In this engine 58, the fan cowl 44 extends the entire length of the engine to encase also the centerbody plug 48. The chevron nozzle defines a mixer 10c disposed concentrically between the fan bypass duct 46 and the core exhaust duct 50 for mixing the fan air 54 with the core gases 56 in a manner analogous to a conventional convoluted daisy mixer. In view of the improved efficiency of the chevron mixer 10c, the aft portion of the fan cowl 44 may be eliminated, if desired, for reducing weight and further increasing performance through reduced friction and boattail drag.

Figure 8:
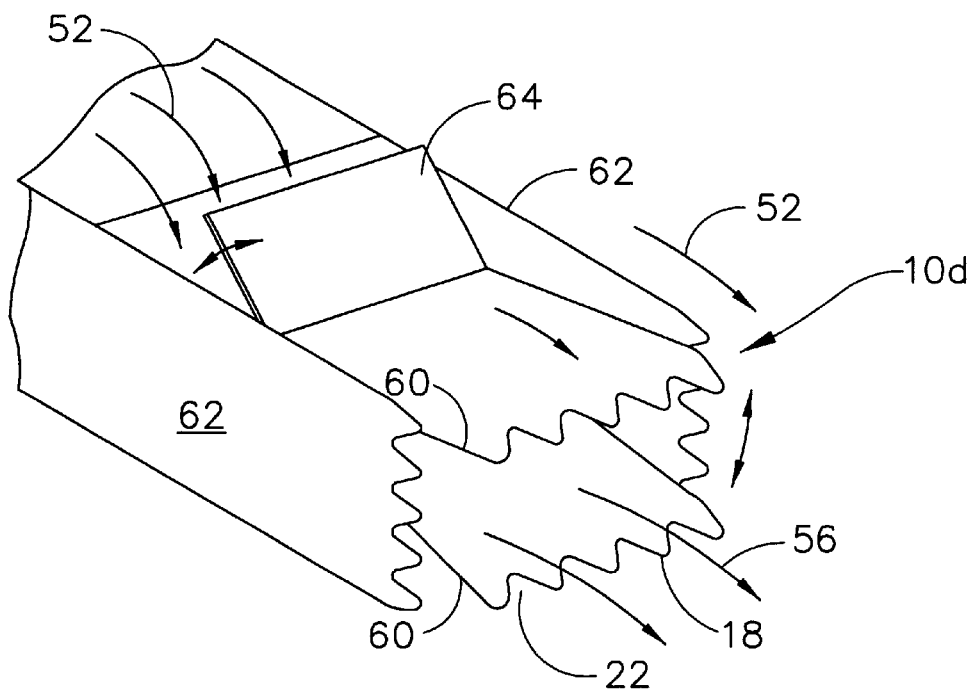
FIG. 8 is a schematic representation of a two-dimensional mixer ejector nozzle including chevrons in accordance with an alternate embodiment of the present invention.

FIG. 8 illustrates yet another embodiment of the chevron exhaust nozzle designated 10d in an otherwise conventional two-dimensional rectangular mixer-ejector exhaust nozzle. The chevron nozzle 10d is defined by a plurality of opposing movable exhaust flaps 60 having the chevrons 18 and slots 22 disposed at an aft end thereof. The chevron nozzle 10d is rectangular in this embodiment and is further defined by a pair of opposite sidewalls 62 laterally bounding the exhaust flaps 60. Disposed at the aft ends of the sidewall 62 are additional ones of the chevrons 18 and slots 22 which cooperate with the flap chevrons for jet noise and infrared signature reduction. In this embodiment, the chevron nozzle 10d includes conventional movable ejector doors 64 which open as illustrated in FIG. 8 for receiving a portion of ambient air 52 for internally mixing with the core jet 56. The ambient air 52 also flows outside the nozzle and over the several chevrons 18 for mixing with the core jet 56 as described in the alternate embodiment.

Since the chevrons 18 and cooperating chevron slots 22 are relatively simple components, they may be incorporated at the junction of any two gas streams where desired for promoting mixing thereof to advantage. This specific configurations of the chevrons and slots may be optimized for each design application for maximizing noise reduction and infrared signature reduction as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A nozzle for exhausting a gas jet from a gas turbine engine comprising:

an exhaust duct for channeling said jet along an inner surface thereof;

a plurality of adjoining chevrons disposed at an aft end of said duct to define an exhaust outlet;

each of said chevrons being triangular in configuration, with a base fixedly joined to said duct aft end laterally coextensively with adjacent chevron bases, an opposite apex, a pair of laterally opposite trailing edges converging from said base to said apex, and radially opposite outer and inner surfaces bounded by said trailing edges and base, with said chevron inner surfaces at said bases being laterally and radially coextensive with said duct inner surface;

said trailing edges of adjacent chevrons being spaced laterally apart to define respective laterally diverging slots disposed in flow communication with said duct for channeling flow radially therethrough; and said chevrons having a compound concave contour both axially between said bases and apexes and laterally between said trailing edges thereof to define a bowl in one of said outer and inner surfaces thereof.

2. A nozzle according to claim 1 wherein said chevrons and slots are generally laterally coextensive for minimizing radial projection into said jet.

3. A nozzle according to claim 2 wherein said chevron outer surface is convex, and said chevron inner surface defines said concave bowl.

4. A nozzle according to claim 2 wherein said jet flows through said duct with a boundary layer along said inner surface thereof, and said chevron apexes are displaced radially in depth from a tangent to said chevron bases with a magnitude on the order of the thickness of said boundary layer thereat.

5. A nozzle according to claim 2 wherein said chevrons are spaced laterally apart at said bases.

6. A nozzle according to claim 2 wherein said chevrons have equal length E from said bases to apexes.

7. A nozzle according to claim 6 wherein said chevron apexes are coplanar.

8. A nozzle according to claim 2 wherein said duct comprises a core engine nozzle for discharging combustion gases in said jet.

9. A nozzle according to claim 2 wherein said duct comprises a fan nozzle for discharging fan air in said jet.

10. A nozzle according to claim 2 wherein said duct comprises a mixer disposed radially between a fan bypass duct and a core exhaust duct for mixing fan air and core gases.

11. A nozzle according to claim 2 defined by a plurality of opposing movable flaps having said chevrons and slots disposed at an aft end thereof.

12. A nozzle according to claim 11 being rectangular, and further defined by a pair of opposite sidewalls bounding said flaps, and also having said chevrons and slots disposed at an aft end thereof.

13. A nozzle according to claim 2 wherein said chevron outer and inner surfaces are parallel to each other.

14. A nozzle according to claim 2 wherein said chevrons have a constant thickness.

15. A nozzle according to claim 2 wherein said chevron inner and outer surfaces are coextensive with said duct inner surface and an outer surface thereof, respectively.

16. A nozzle according to claim 2 wherein said chevrons are laterally contiguous at said bases.

17. A nozzle according to claim 2 wherein said chevron outer surface defines said concave bowl, and said chevron inner surface is convex.

18. A nozzle according to claim 2 wherein said chevrons tangentially blend with said duct aft end, with said bowl being nonlinear in contour both axially and laterally.

19. A gas turbine engine nozzle for exhausting a gas jet comprising an annular exhaust duct and a plurality of circumferentially adjoining triangular chevrons extending integrally therefrom at a common radius to define an exhaust outlet, and each of said chevrons has a shallow compound contour bowl therein.

20. A nozzle according to claim 19 wherein said chevrons are circumferentially contiguous around said duct and tangentially blend therewith, with said bowls terminating thereat.

* * * * *